Aug. 23, 1960      J. C. MODIE      2,950,054

ELECTRICAL COMPUTING APPARATUS

Filed Feb. 14, 1955

*INVENTOR.*
JOSEPH C. MODIE
BY *Arthur H. Swanson*
ATTORNEY.

United States Patent Office 2,950,054
Patented Aug. 23, 1960

2,950,054

ELECTRICAL COMPUTING APPARATUS

Joseph C. Modie, Philadelphia, Pa., assignor to Minneapolis-Honeywell Regulator Company, Minneapolis, Minn., a corporation of Delaware Filed Feb. 14, 1955, Ser. No. 487,882

12 Claims. (Cl. 235—196)

A general object of the present invention is to provide a new improved electrical signal ratio measuring or control apparatus. More specifically, the present invention is concerned with an electrical signal ratio measuring apparatus which is characterized by its accuracy, its sensitivity, and the ease by which the individual constants and coefficients associated with the input and output signals may be adjusted without affecting the other coefficients of the apparatus.

Electrical ratio measuring apparatus may be used in determining the ratio of one electrical signal with respect to another or it may be used for varying the ratio between two electrical signals in accordance with the value of a third. Regardless of the end use of the ratio measuring apparatus, it has been found desirable to provide an apparatus which will have independently adjustable coefficients and constants associated with each of the electrical signals involved. This may best be understood by reference to the ideal equation for a ratio measuring or control apparatus which is as follows:

$$(B+I_2) = (A+I_1)(n+CI_3)$$

where $I_1$, $I_2$, and $I_3$ are the electrical input signals. A, B, C, and $n$ are the constants and coefficients associated with the electrical signals and it is these that should be independently adjustable in an ideal form of ratio measuring or control apparatus.

It is therefore a more specific object of the present invention to provide an improved ratio measuring and/or control apparatus wherein the constants and coefficients associated with the input and output electrical signals are each independently adjustable without affecting the value of any of the other coefficients and constants.

The foregoing objects of the present invention in a preferred apparatus embodiment are achieved by providing separate electro-magnetic signal producing units, each of which has an electrical input and each of which is made stable by force balancing of the unit in accordance with the magnitude of the output of each unit. Each such unit is so arranged as to add or subtract a fixed constant so that each unit output will be a function of the input and some additional factor. These individual units are electrically and mechanically interconnected so that they may accomplish the desired multiplying or dividing functions necessary to satisfy the above ideal ratio measuring equation.

It is therefore a further object of the present invention to provide an improved ratio measuring or control apparatus employing a plurality of independently adjustable electro-magnetic signal producing units connected to produce a ratio measuring or control function.

A still further object of the present invention is to provide an improved ratio measuring apparatus employing a plurality of independently adjustable force balanced electro-magnetic units which are interconnected to produce an output signal which is a preselected function of two separate electrical input signals.

The various features of novelty which characterize the invention are pointed out with particularity in the claims annexed to and forming a part of this specification. For a better understanding of the invention, its advantages, and specific objects attained with its use, reference should be had to the accompanying drawings and descriptive matter in which there is illustrated and described a preferred embodiment of the invention.

Figure 1:
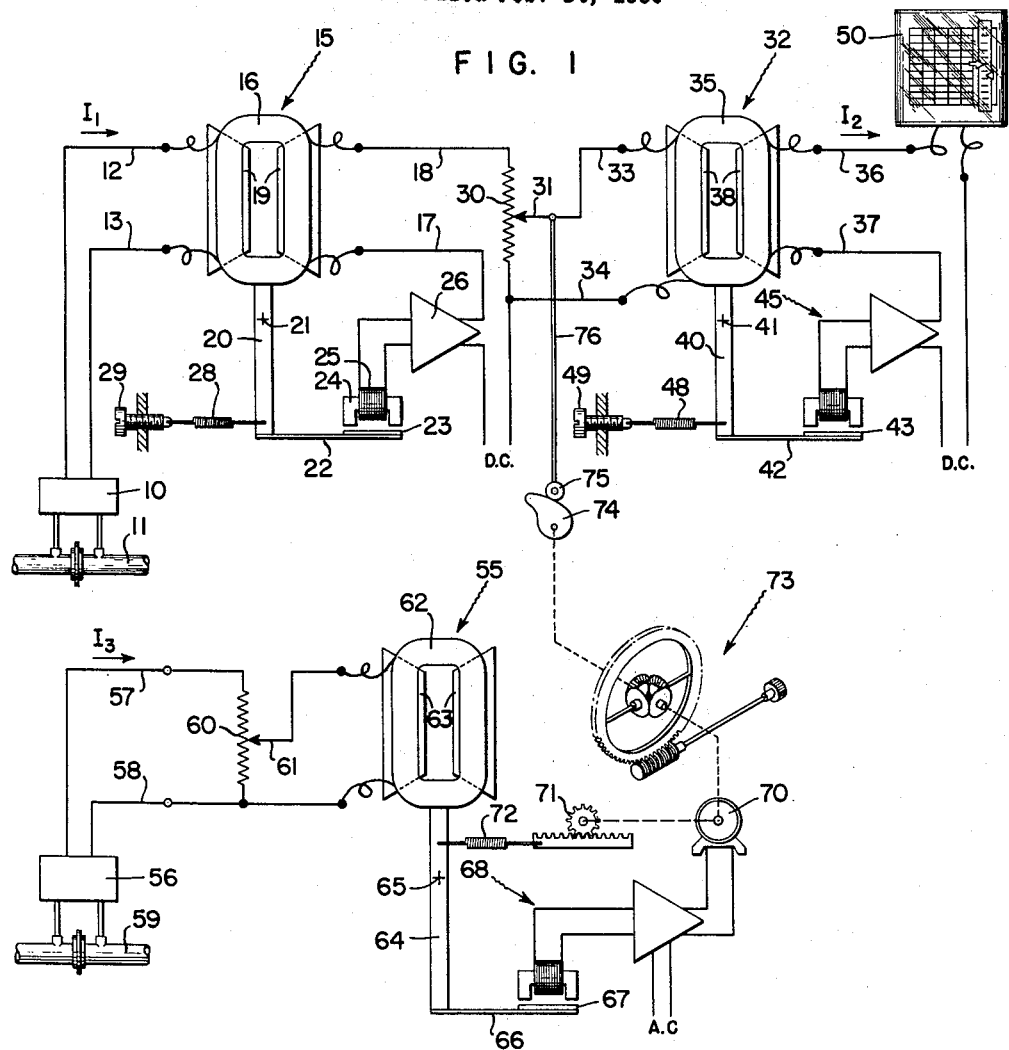
Fig. 1 is a schematic diagram showing of the overall ratio measuring or control apparatus.

Referring first to Fig. 1, the numeral 10 represents a flow measuring apparatus which is adapted to produce an electrical signal proportional to the rate of the flow of fluid through a conduit 11. While a flow measuring apparatus is disclosed, it is to be understood that any type of an electrical signal producing device could be utilized in place of this transmitter 10. A transmitter of this type will be found in a copending application of William F. Newbold, bearing Serial No. 391,207, and filed November 10, 1953, now Patent No. 2,762,938, and may desirably be employed.

The output electrical signals from the transmitter 10 are passed by way of leads 12 and 13 to a first electromagnetic signal converting unit 15. This unit comprises a coil means 16 which is wound in two equal sections, one section having as input terminals the leads 12 and 13 and the other section having input terminals formed by the leads 17 and 18. Coil means 16 is adapted to cooperate with a pair of permanent magnets 19 and to move relative thereto in accordance with the magnitudes of the input electrical signals. The coil means 16 is mounted upon a pivoted member 20 bearing a pivot 21. The coil means 16 and the associated components 19, 20 and 21 may well take the form of the electric force producing unit disclosed in the copending application of Philip E. Shafer, bearing Serial No. 433,505, and filed June 1, 1954, now Patent No. 2,847,619.

Fastened to the end of the pivoted member 20 is an arm 22 which carries a ferrite core member 23 at its outer extremity. The core member 23 cooperates with a further core member 24 to vary the air gap of the member 24 and thereby the inductance of the coil 25. The coil 25 is in turn a part of an oscillator amplifier section 26, the latter of which has an output current which is proportional to the magnitude of the inductance of the coil 25. Thus, the output of the amplifier 26 will be a function of the motion of the coil means 16. This motion sensing mechanism may well take the form of the motion sensing means disclosed in detail in the copending application of William J. Popowsky, bearing Serial No. 442,264, and filed July 9, 1954, now Patent No. 2,847,625.

Also associated with the pivoted member 20 is a spring member 28 which is adjustable by a variable adjusting means 29.

The output current of the amplifier section 26 is connected to flow through the feedback coil means by way of terminals 17 and 18 through a multiplying potentiometer 30. This potentiometer 30 has a slider 31 cooperating therewith. The slider 31 is in turn connected to the input of a further electro-magnetic signal reproducing means 32 by way of leads 33 and 34. Electromagnetic signal reproducing means 32 comprises a coil means 35 with the coil means corresponding to the coil means 16. This coil means has one set of input terminals by way of leads 33 and 34 and a further pair of input leads by way of terminals 36 and 37.

The coil means 35 cooperates with permanent magnetic members 38. The coil means 35 is mounted on a pivoted member 40 which is pivoted at 41. Attached to the lower end of the pivoted member 40 is an extension 42, the latter of which carries at its outer extremity a ferrite core member 43. This core member functions in the same manner as the core member 23 as an input element for a motion sensing means 45. This sensing means 45 corresponds identically with the sensing means 24—26 as disclosed in the above-mentioned Popowsky application.

A spring member 48 is connected to the pivoted member 40 for providing a biasing force thereto and this spring member is adjustable by a suitable adjustment 49. The output current from the motion sensing apparatus 45 will flow through the leads 37—36 to an output indicating and control instrument 50.

The adjustment of the slider 31 is accomplished by a further electro-magnetic signal reproducing mechanism 55. This mechanism 55 has as its input a flow transmitter 56 which is connected to produce an electrical signal in its output leads 57 and 58 in accordance with the rate of flow of the fluid through the conduit 59. This flow transmitter may be of the type disclosed in the above mentioned Newbold application. The current from the transmitter 56 flowing through the leads 57 and 58 passes through a span adjusting potentiometer 60 having a slider 61 cooperating therewith. The signal on the slider 61 and the lower end of the potentiometer slidewire resistor 60 is connected to a coil means 62, the latter of which cooperates with a pair of permanent magnetic members 63. This form of apparatus is likewise of the type disclosed in the above mentioned Shafer application. Connected to the coil means 62 and supporting the same is a member 64 which is pivoted at 65.

Attached to the lower end of the member 64 is an extension 66, the latter of which carries at its outer extremity a core member 67. This core member forms a part of the motion sensing mechanism 68 which again may be of the type disclosed in the above-mentioned Popowsky application. The output of the motion sensing apparatus, in this instance is connected to reversibly control a motor 70. The motor 70 is connected by way of a rack and pinion gear mechanism 71 to a spring 72, the latter of which is used for force balancing the member 64. The motor 70 is also connected by way of a shaft angle adjusting mechanism 73 to a characterized cam 74. The cam 74 has a follower 75 which rides upon the cam surface and adjusts the position of the slider 31 upon the resistor 30 by way of a link 76.

As mentioned above, it is desired that the present apparatus function in a manner to satisfy the ideal equation for a ratio measuring apparatus. As the apparatus is presently arranged, it is desired that the output current $I_2$ to the instrument 50 be a predetermined function of a the input current $I_1$ from the transmitter 10 and the input current $I_3$ from the transmitter 56.

First to be considered is the current $I_1$ and the manner in which the constant A, from the ideal equation, is added thereto. The current $I_1$ is produced by the flow transmitter 10 and will flow into the input terminals 12—13 of the coil means 16. The current flowing in the input section of the coil means 16 will cause a reaction force to be produced between the coil means 16 and the permanent magnetic members 19 so that the pivoted member 20 will tend to move. The movement of the member 20 will be detected by the motion sensing means 22—26 and there will be an output current produced in the oscillator-amplifier section 26 proportional to that motion. The output current will flow through the terminals 17—18 of the feedback section of the coil means 16 to force balance the force produced by the current flowing in the input section to terminals 12—13. Thus, in the absence of any additional forces acting upon the coil means 16, the current $I_1$ on the input will be the current $I_1$ flowing in the output through the potentiometer resistor 30 of the multiplying potentiometer. It has been assumed thus far that the spring 28 has not added any forces to the member 20. However, by adjusting the adjustable means 29, the spring 28 may be used to exert a force upon the pivoted member 20. This force will be added to the force created by the current $I_1$ flowing in the input terminals 12—13 so that the resultant force necessary to balance the input forces will be a force proportional to the sum of the force produced by the current $I_1$ and the force produced by the spring 28. Thus, the spring 28 provides the term A in the ideal equation for ratio measuring apparatus and the output current flowing through the potentiometer resistor 30 will be $A+I_1$.

Next to be considered is the manner in which the current $I_3$ has been modified to incorporate a fixed constant and a multiplier. In this apparatus the transmitter 56 will produce an output current proportional to the rate of flow of fluid in the conduit 59 in the output leads 57—58. This current will be current $I_3$. This current flows directly through the potentiometer resistor 60. The slider 61 cooperates with the resistor 60 to provide a means for multiplying the current $I_3$ times a constant. Thus, the position of the slider 61 corresponds to the constant C in the ideal equation. The current flowing into the input terminals of the coil means 62 will be $CI_3$ and this current flow will produce a reaction force upon the pivoted member 64. The motion of the member 64 will be detected by the motion sensing means 67—68 and the motor 70 will be driven in a direction to move the pinion on rack 71 so that the spring 72 will provide a force to balance the input force created by the current flowing in the coil means 62. In this way, the angular rotation of the motor 70 may be made proportional to the input current multiplied by the constant C.

It is now desired to add an additional factor to the output from the motor 70. The adjustment of the shaft interconnecting the motor 70 and the cam 74 as it moves the follower 75 provides the fixed constant $n$ in the ideal equation. Thus, the cam 74 in being driven by the motor 70 will position the slider 31 on the slidewire resistor 30 in accordance with the term $n+CI_3$. There is provided in the adjustable gear mechanism 73 a means by which it is possible to adjust the angular shaft position on the output of the motor relative to the final shaft position as it connects to the cam 74.

The potentiometer resistor 30 and the slider 31 are connected in a multiplying configuration. In other words, the current flowing in the input leads 33—34 of the input section of the coil means 35 will be the product of the current flowing through the resistor 30 and the function resulting in the positioning of the slider 31. In terms of the ideal equation, the current flowing in the leads 33—34 will correspond to $(A+I_1)(n+CI_3)$.

The current flow in the leads 33—34 in passing through the input section of the coil means 35 will produce a reaction force in the coil means 35 with respect to the permanent magnets 38. This reaction force will cause the output pivoted member 40 to be positioned in accordance with this input force and the motion of the member will be detected by the motion sensing means 43—45. The output of the motion sensing means will be a current flowing in the output leads 36—37 which current is fed back through the feedback section of the coil means 35 to force balance the input forces. The output current will also be passed through the indicating and/or controlling instrument 50.

The spring 48 adds a biasing force to the pivoted member 40 and this biasing force will correspond to the constant B in the ideal equation. In other words, the balancing force acting upon the member 40 will be the force created by the spring 48 plus the force created by the current $I_2$ flowing through the feedback section of the coil means 35.

The cam 74 may be desirably characterized so as to eliminate any error in the multiplying operation accomplished by the slider 31 moving over the resistor 30. This error may result if the input section of the coil means 35, as identified by the terminal 33—34, is low relative to the impedance of the resistor 30. The characterization will depend upon the relative impedance of the input section of the coil and the resistor 30.

Figure 2:
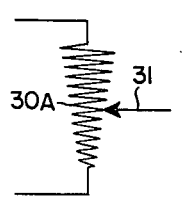
Fig. 2 shows a modification of the portion of Fig. 1.

The resistor 30 may also be characterized as shown in Fig. 2. Here, the resistor 30 has been changed and is identified by the numeral 30A. This resistor is characterized so that there is a larger resistance change at the upper end of the resistor than at the lower end with the resistance changing gradually in a decreasing manner as the slider 31 is moved from the upper end toward the lower end. When the characterized resistor is used, the characterization of the cam 74 is no longer required.

Figure 3:
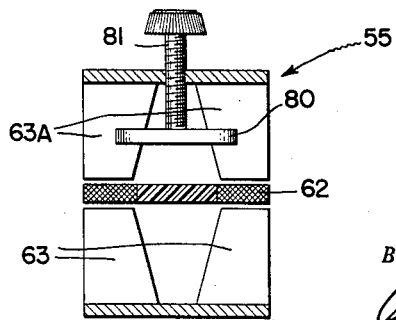
Fig. 3 shows a cross-sectional view of a portion of the apparatus shown in Fig. 1 and a modification of that portion whereby a span adjustment may be accomplished.

Fig. 3 shows a representative cross-section of the electro-magnetic means 55 of Fig. 1. This electro-magnetic means has been modified to eliminate the necessity of the span adjusting potentiometer 60 and slider 61 of Fig. 1. The span adjustment here may be accomplished by a magnetic shunt 80 which is movable along the permanent magnet members 63A by an adjustable threaded member 81. This magnetic shunt will then function in the same manner as the potentiometer to provide the coefficient C in the ideal equation.

While, in accordance with the provisions of the statutes, there have been illustrated and described the best forms of the invention known, it will be apparent to those skilled in the art that changes may be made in the form of the apparatus disclosed without departing from the spirit of the invention as set forth in the appended claims, and that in some cases certain features of the invention may be used to advantage without a corresponding use of other features.

Having now described the invention, what is claimed as new and for which it is desired to secure Letters Patent is:

1. In electrical ratioing apparatus, the combination comprising, a first electro-magnetic device having a pair of coil means movable in a magnetic field, means for applying an input signal to a first one of said means, means sensing the motion of said coil means and producing an output electrical signal for connection to the other one of said coil means to force balance said first device, a potentiometer resistor in series with said sensing means, a second electro-magnetic device having a pair of coil means movable in a magnetic field, means connecting one end of said resistor and an adjustable tap thereon to one of said last named pair of coils, motion sensing means detecting the motion of said last named means and producing an output electrical signal for connection to the other of said coils of said last named coil means, to force balance said second electro-magnetic device, and a third electrical signal responsive means connected to variably adjust said tap.

2. In an electrical ratioing apparatus, the combination comprising a potentiometer resistor having a movable slider, means connected to said resistor to produce a current flow therethrough proportional to a first input signal, a slider adjusting means, said slider adjusting means comprising motor means whose motion is regulated by the magnitude of a second input signal, an electro-magnetic device comprising first coil means connected to said slider and to one end of said potentiometer resistor, means connected to said coil means for detecting the motion thereof and producing an output signal which is a function of said first and second input signals, and a second coil means connected to said detecting means to force balance said electro-magnetic device.

3. Apparatus as defined in claim 2 wherein said electro-magnetic device has an adjustable biasing spring connected thereto to vary the output signal from said detecting means by a predetermined amount.

4. An electrical ratio relay comprising a first signal source, first electro-magnetic means connected to said first signal source and producing an output signal which is a function of the input signal plus a first adjustable constant, a second signal source, second electro-magnetic means connected to said second signal source, said second electro-magnetic means having an output which is a function of the input signal from said second signal source plus a second adjustable constant, a potentiometer resistor having a slider thereon, means connecting said resistor to said first electro-magnetic means so that the output signal flows therethrough, means connecting said slider to be adjusted by said second electro-magnetic means in accordance with the output thereof, and a third electro-magnetic means having an input connected to said slider and said resistor, said third electro-magnetic means having an output which is a function of the product of the outputs of said first and second electro-magnetic means.

5. Apparatus as defined in claim 4 wherein each of said electro-magnetic means comprises input coil means mounted for movement in a magnetic field, coil motion sensing means, and means actuated by said motion sensing means to balance the force acting on said input coil means.

6. Apparatus as defined in claim 4 wherein said second electro-magnetic means includes a span adjusting means for directly varying the effective magnitude of the input signal from said second signal source.

7. In an electrical ratioing apparatus, the combination comprising a potentiometer resistor having a movable slider, means connected to said resistor to produce a current flow therethrough proportional to a first input signal, a slider adjusting means, said slider adjusting means comprising motor means whose motion is regulated by the magnitude of a second input signal, an electro-magnetic device comprising first coil means connected to said slider and to one end of said potentiometer resistor, means connected to said coil means for detecting the motion thereof and producing an output signal which is a function of said first and second input signals, a second coil means connected to said detecting means to force balance said electro-magnetic device, and a non-linear means connected between said slider and said slider adjusting means to compensate for the loading of said resistor by said coil means.

8. Electrical apparatus comprising a first electro-magnetic force balanced means having an electrical input and an electrical output, said means comprising a balanceable member having a first resilient biasing means connected thereto, a second electro-magnetic force balanced means having an electrical input and a mechanical output, an electro-mechanical signal multiplying means having said electrical output and said mechanical output connected thereto, and a third electro-magnetic force balanced means having an electrical input connected to said signal multiplying means and an electrical output, said third electro-magnetic means comprising a force balanceable member having a second resilient biasing means connected thereto.

9. Electrical apparatus comprising a first electro-magnetic force balanced means having an electrical input and an electrical output, said means comprising a balanceable member having a first resilient biasing means connected thereto, a second electro-magnetic force balanced means having an electrical input and a mechanical output, said second electro-magnetic force balanced means comprising a balanceable member having a first force applied thereto by a coil means and a balancing force applied thereto by a motor driven spring, an electro-mechanical signal multiplying means having said electrical output and said mechanical output connected thereto, and a third electro-magnetic force balanced means having an electrical input connected to said signal multiplying means and an electrical output, said third electro-magnetic means comprising a force balanceable member having a second resilient biasing means connected thereto.

10. Electrical apparatus comprising a first electro-magnetic force balanced means having an electrical input and an electrical output, said means comprising a balanceable member having a first resilient biasing means connected thereto, a second electro-magnetic force balanced means having an electrical input and a mechanical output, said mechanical output having a manually adjustable coefficient selecting means included therewith, an electro-mechanical signal multiplying means having said electrical output and said mechanical output connected thereto, and a third electro-magnetic force balanced means having an electrical input connected to said signal multiplying means and an electrical output, said third electro-magnetic means comprising a force balanceable member having a second resilient biasing means connected thereto.

11. Electrical apparatus comprising a first electro-magnetic force balanced means having an electrical input and an electrical output, said means comprising a balanceable member having a first resilient biasing means connected thereto, a second electro-magnetic force balanced means having an electrical input and a mechanical output, said last named electrical input having a span adjusting resistor connected thereto and said mechanical output having a manually adjustable coefficient selecting means included therewith, an electro-mechanical signal multiplying means having said electrical output and said mechanical output connected thereto, and a third electro-magnetic force balanced means having an electrical input connected to said signal multiplying means and an electrical output, said third electro-magnetic means comprising a force balanceable member having a second resilient biasing means connected thereto.

12. Apparatus as defined in claim 11 wherein each of said electro-magnetic force balance means comprises a coil means which is positioned to move in a magnetic field and produce an output force which varies linearly with the net ampere turns of said coil means.

References Cited in the file of this patent

UNITED STATES PATENTS

| | | |
|---|---|---|
| 1,171,213 | Knopp | Feb. 8, 1916 |
| 1,578,831 | Keeler | Mar. 30, 1926 |
| 2,310,955 | Hornfeck | Feb. 16, 1943 |
| 2,636,151 | Hornfeck | Apr. 21, 1953 |
| 2,686,635 | Markson | Aug. 17, 1954 |
| 2,784,501 | Stern et al. | Mar. 12, 1957 |

OTHER REFERENCES

Electronic Instruments (Greenwood et al.), published by McGraw-Hill Book Co., New York, 1948, pp. 202–203.

Electronic Analog Computers (Korn and Korn), published by McGraw-Hill Book Co., New York, 1952, pp. 215–218.

"An Electro-Mechanical Multiplier for Analog Computer Application" (Dorsey), Proceedings of Electronic Computer Symposium, April 30, May 1, 2, 1952 in Los Angeles (The Los Angeles IRE Group on Electronic Computers With UCLA), Nov. 1952, pages V–1, V–7.